United States Patent
Gilani et al.

(10) Patent No.: US 11,606,420 B1
(45) Date of Patent: Mar. 14, 2023

(54) METHOD AND APPARATUS FOR SERVICE ROUTING

(71) Applicant: Dell Products L.P., Round Rock, TX (US)

(72) Inventors: Irfan Gilani, Cedar Park, TX (US); Gopi Kandhadi, Austin, TX (US); Maleravalappil Mohammad Sadiq, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/508,207

(22) Filed: Oct. 22, 2021

(51) Int. Cl.
*G06F 15/16* (2006.01)
*H04L 67/1014* (2022.01)

(52) U.S. Cl.
CPC .................... *H04L 67/1014* (2013.01)

(58) Field of Classification Search
CPC ................................. H04L 67/1014
USPC ........................................ 709/201
See application file for complete search history.

(56) References Cited

U.S. PATENT DOCUMENTS

| | | | |
|---|---|---|---|
| 7,209,977 B2 * | 4/2007 | Acharya | H04L 69/162 709/240 |
| 8,214,451 B2 * | 7/2012 | Grossner | H04L 67/51 709/224 |
| 8,244,847 B2 * | 8/2012 | Channabasavaiah | G06Q 10/06 709/223 |
| 8,254,288 B2 * | 8/2012 | Lindgren | H04L 61/106 455/433 |
| 8,484,376 B2 * | 7/2013 | Little | H04L 67/10 717/168 |
| 8,843,546 B2 * | 9/2014 | Hanstrom | H04L 67/51 709/204 |
| 9,183,153 B2 * | 11/2015 | Yin | G11B 27/329 |
| 9,258,371 B1 * | 2/2016 | Lai | H04L 67/51 |
| 9,361,446 B1 * | 6/2016 | Demirjian | H04L 63/1441 |
| 9,397,987 B1 * | 7/2016 | Lai | G06Q 30/0601 |
| 9,424,414 B1 * | 8/2016 | Demirjian | G06F 21/36 |
| 9,451,034 B2 * | 9/2016 | Lai | G06Q 30/08 |
| 9,529,578 B2 * | 12/2016 | Smith | G06F 8/65 |
| 9,713,112 B1 * | 7/2017 | Asveren | H04L 65/1073 |
| 9,754,245 B1 * | 9/2017 | Davison | G06Q 20/36 |
| 9,804,835 B2 * | 10/2017 | Bhatia | G06F 8/658 |
| 9,871,795 B2 * | 1/2018 | Demirjian | G06F 21/36 |
| 9,882,787 B2 * | 1/2018 | Peng | H04L 67/1012 |
| 9,940,610 B1 * | 4/2018 | Davison | G06Q 20/12 |
| 9,961,118 B2 * | 5/2018 | Asveren | H04L 65/1073 |
| 10,097,583 B1 * | 10/2018 | Demirjian | H04L 63/08 |
| 10,158,726 B2 * | 12/2018 | Chou | H04L 67/12 |
| 10,205,757 B2 * | 2/2019 | Asveren | H04L 65/1083 |
| 10,348,800 B2 * | 7/2019 | Showalter | H04L 45/126 |
| 10,348,838 B2 * | 7/2019 | Yang | H04L 67/10 |
| 10,579,342 B1 * | 3/2020 | Shemer | G06F 8/34 |

(Continued)

*Primary Examiner* — Alicia Baturay
(74) *Attorney, Agent, or Firm* — Daly, Crowley Mofford & Durkee, LLP

(57) ABSTRACT

A method comprising: obtaining a first instruction for a first service, the first instruction being associated with a routing preference; generating a second instruction for the first service based on the first instruction; associating the second instruction with the routing preference; and providing the second instruction to the first service, wherein associating the second instruction with the routing preference includes at least one of inserting an indication of the routing preference in the second instruction.

20 Claims, 8 Drawing Sheets

(56) References Cited

U.S. PATENT DOCUMENTS

| | | | |
|---|---|---|---|
| 10,645,183 B2* | 5/2020 | Walker | H04L 67/563 |
| 10,708,126 B2* | 7/2020 | Singla | H04L 41/0803 |
| 10,791,044 B1* | 9/2020 | Krishan | H04L 43/50 |
| 10,805,407 B2* | 10/2020 | Chou | H04L 41/5012 |
| 10,810,563 B1* | 10/2020 | Davison | G06Q 20/12 |
| 10,896,159 B1* | 1/2021 | Michaeli | G06F 16/245 |
| 10,908,897 B2* | 2/2021 | Hintermeister | G06F 8/77 |
| 11,212,286 B2* | 12/2021 | Schmitt | G06F 3/0664 |
| 11,281,452 B2* | 3/2022 | Liljeback | G06F 9/45558 |
| 11,282,082 B2* | 3/2022 | Nelsen | G06Q 20/40 |
| 11,288,055 B2* | 3/2022 | Jean-Louis | G06F 8/65 |
| 11,310,106 B2* | 4/2022 | Singla | H04L 41/12 |
| 11,412,053 B2* | 8/2022 | Yang | H04L 67/1012 |
| 11,422,791 B2* | 8/2022 | Guo | G06F 8/71 |
| 2008/0195622 A1* | 8/2008 | Lelcuk | G06F 16/252 707/999.009 |
| 2022/0121502 A1* | 4/2022 | Schmitt | G06F 9/4881 |

* cited by examiner

ROUTING PREFERENCE 132

{SERVICE 1, *VERSION_2*} ⎯ 301
{SERVICE 2, *VERSION_1*} ⎯ 302
{SERVICE 3, *VERSION_1*} ⎯ 303

FIG. 3

LOAD BALANCING POLICY 107

⎯ 401

60% OF INSTRUCTIONS FOR SERVICE 1 MUST BE ROUTED TO AN INSTANCE OF A FIRST VERSION OF SERVICE 1;

40% OF INSTRUCTIONS FOR SERVICE 1 MUST BE ROUTED TO AN INSTANCE OF A SECOND VERSION OF SERVICE 1

⎯ 402

55% OF INSTRUCTIONS FOR SERVICE 2 MUST BE ROUTED TO AN INSTANCE OF A FIRST VERSION OF SERVICE 2;

45% OF INSTRUCTIONS FOR SERVICE 2 MUST BE ROUTED TO AN INSTANCE OF A SECOND VERSION OF SERVICE 2

⎯ 403

53% OF INSTRUCTIONS FOR SERVICE 3 MUST BE ROUTED TO AN INSTANCE OF A FIRST VERSION OF SERVICE 3;

47% OF INSTRUCTIONS FOR SERVICE 3 MUST BE ROUTED TO AN INSTANCE OF A SECOND VERSION OF SERVICE 3

FIG. 4

```
┌─ 501
│ IF(SERVICE 1 IS IN STATE #1)
│     SELECT A SERVICE VERSION BASED ON A LOAD BALANCING GOAL
│ IF (SERVICE 1 IS IN STATE #2)
│     SELECT A SERVICE VERSION BASED ON A ROUTING PREFERENCE
└─
```

FIG. 5A

```
┌─ 502
│ IF(SERVICE 2 IS IN STATE #1)
│     SELECT A SERVICE VERSION BASED ON A ROUTING PREFERENCE
│ IF (SERVICE 2 IS IN STATE #2)
│     SELECT A DEFAULT SERVICE VERSION
└─
```

FIG. 5B

```
┌─ 503
│ IF(SENDER ID SATISFIES A FIRST CONDITION)
│     SELECT A FIRST SERVICE VERSION
│ IF(SENDER ID SATISFIES A SECOND CONDITION)
│     SELECT A SECOND SERVICE VERSION
│ ELSE SELECT A SERVICE VERSION BASED ON A ROUTING PREFERENCE
└─
```

METHOD AND APPARATUS FOR SERVICE ROUTING

BACKGROUND

Microservices are an approach to distributed systems that promote the use of finely grained services. They can be deployed independently of each other, and permit modularization of larger software systems into smaller parts. Microservices can be implemented as separate processes that communicate with each other over a communications network.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method is provided comprising: obtaining a first instruction for a first service, the first instruction being associated with a routing preference; generating a second instruction for the first service based on the first instruction; associating the second instruction with the routing preference; and providing the second instruction to the first service, wherein associating the second instruction with the routing preference includes at least one of inserting an indication of the routing preference in the second instruction.

According to aspects of the disclosure, a system is provided, comprising: a memory; and at least one processor operatively coupled to the memory, the at least one processor being configured to perform the operations of: obtaining a first instruction for a first service, the first instruction being associated with a routing preference; generating a second instruction for the first service based on the first instruction; associating the second instruction with the routing preference; and providing the second instruction to the first service, wherein associating the second instruction with the routing preference includes at least one of inserting an indication of the routing preference in the second instruction, and/or inserting the indication of the routing preference into a cookie.

According to aspects of the disclosure, a non-transitory computer-readable medium is provided that stores one or more processor-executable instructions, which, when executed by at least one processor, cause the at least one processor to perform the operations of: obtaining a first instruction for a first service, the first instruction being associated with a routing preference; generating a second instruction for the first service based on the first instruction; associating the second instruction with the routing preference; and providing the second instruction to the first service, wherein associating the second instruction with the routing preference includes at least one of inserting an indication of the routing preference in the second instruction, and/or inserting the indication of the routing preference into a cookie.

BRIEF DESCRIPTION OF THE DRAWINGS

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 3 is a diagram of an example of a routing preference, according to aspects of the disclosure;

FIG. 4 is a diagram of an example of a load balancing policy, according to aspects of the disclosure;

FIG. 5A is a diagram of an example of a routing policy, according to aspects of the disclosure;

FIG. 5B is a diagram of an example of a routing policy, according to aspects of the disclosure;

FIG. 5C is a diagram of an example of a routing policy, according to aspects of the disclosure;

DETAILED DESCRIPTION

Figure 1:
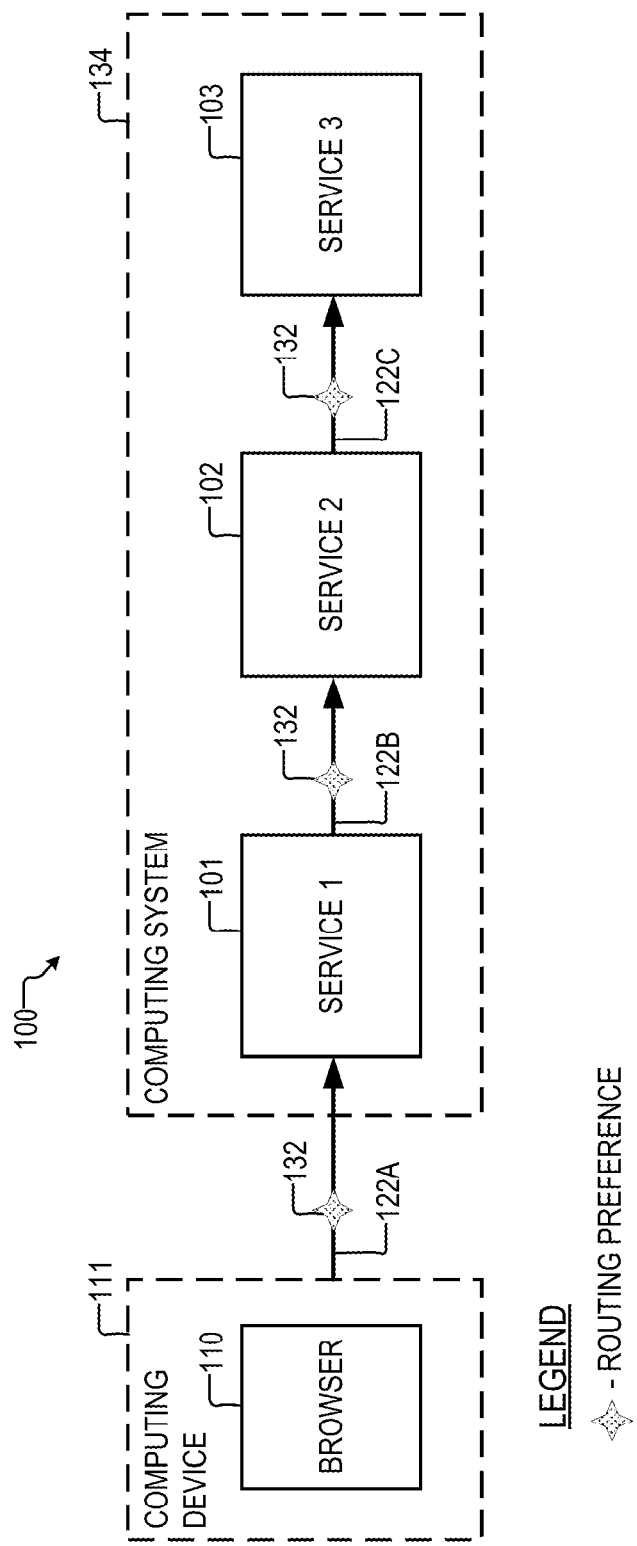
FIG. 1 is a diagram of an example of a call sequence, according to aspects of the disclosure.

FIG. 1 is a diagram of a service call sequence 100. The service call sequence 100 includes instructions 122A, 122B, and 122C, which are successively generated. Instruction 122A is transmitted by a browser 110 to a service 101. Instruction 122B is generated by service 101 in response to instruction 122A. Instruction 122B is transmitted by service 101 to service 102. Instruction 122C is generated by service 102 in response to instruction 122B. Instruction 122C is transmitted by service 102 to service 103.

In some implementations, instruction 122B may include information that is generated as a result of executing instruction 122A. Additionally or alternatively, in some implementations, instruction 122B may be issued as part of executing instruction 122A, and it may return information that is needed for the completion of instruction 122A. In some implementations, instruction 122C may include information that is generated as a result of executing instruction 122B. Additionally or alternatively, in some implementations, instruction 122C may be issued as part of executing instruction 122B, and it may return information that is needed for the completion of instruction 122B.

The browser 110 may be executed on a client device 111. The client device 111 may be the same or similar to the computing device 900, which is discussed further below with respect to FIG. 9. Browser 110 may include a web browser, such as a Firefox™ browser or a Microsoft Edge™ browser. Although in the example of FIG. 1 instruction 122B is transmitted by a browser, alternative implementations are possible in which instruction 122A is transmitted by other software that is executed on the client device 111.

Services 101-103 may be executed on a computing system 134. According to the present example, the computing system 134 includes a plurality of computing devices, such as the computing device 900 (shown in FIG. 9), which are coupled to one another via a communications network. However, alternative implementations are possible in which the computing system 134 includes a single computing device, such as the computing device 900 (shown in FIG. 9).

Each of services 101-103 may have multiple instances that are running on the computing system 134. Each service instance may include one or more processes that have been instantiated based on code (e.g., source code, intermediate code, binary code, etc.) implementing the service. Moreover, two instances of a service (e.g., service 101) may be instantiated based on different versions of the code implementing the service (e.g., service 101). In other words, at any given time, the computing system 134 may be executing a first version of the service 101 (i.e., a version that is instantiated based on a first version of the code implementing service 101) and a second version of the service 101 (i.e., a version that is instantiated based on a second version of the code implementing service 101). The second version may be different from the first version.

According to the example of FIG. 1, block 101 represents all instances of service 101 that are running on the computing system 134. Block 102 represents all instances of service 102 that are running on the computing system 134. Block 103 represents all instances of service 103 that are running on the computing system 134. In this regard, it will be understood that FIG. 1 shows an example of a sequence in which services 101-103 can be called, but it does not show the flow of instructions 122A-C between individual instances of services 101-103. Different instances of any given one of services 101-103 may have the same interface and may be configured to perform the same operations. However, as noted above, different instances of any given one of services 101-103 may be instantiated based on different versions of the same body of code and as a result one version of the same service may be more efficient than the other or contain bugs that are not found in the other. Additionally or alternatively, different instances in any given one of services 101-103 may have different capabilities and/or functionalities.

Each of instructions 122A, 122B, and 122C may be routed through a routing module 106 (shown in FIG. 2), which is also executed on the computing system 134. The routing module 106 may include one or more of a service orchestrator, a service frontend, a load balancer, a reverse proxy, and/or any other suitable type of software that is configured to provide an interface (or switching fabric) for the exchange of messages (e.g., instructions) between the browser 110 and the services 101-103 and/or between different ones of the services 101-103.

For example, a first version of instruction 122A may be provided by the browser 110 to the routing module 106. In some implementations, the routing module 106 may generate a second version of instruction 122A based on the first version and forward the second version to a selected instance of service 101. The second version of instruction 122A may by generated by one or more of creating a copy of the first version of instruction 122A, decomposing the first version into subtasks, performing variable translation, performing opcode translation, performing insertion of additional information into the second version, such as an identifier corresponding to a particular instance of service 101, etc.

A first version of instruction 122B may be provided by service 101 to the routing module 106. The routing module 106 may generate a second version of instruction 122B based on the first version and forward the second version to a selected instance of service 102. The second version of instruction 122B may by generated by one or more of creating a copy of the first version of instruction 122B, decomposing the first version into subtasks, performing variable translation, performing opcode translation, performing insertion of additional information into the second version, such as an identifier corresponding to a particular instance of service 102, etc.

A first version of instruction 122C may be provided by service 102 to the routing module 106. The routing module 106 may generate a second version of instruction 102C based on the first version and forward the second version to a selected instance of service 102. The second version of instruction 122C may be generated by one or more of creating a copy of the first version of instruction 122C, decomposing the first version into subtasks, performing variable translation, performing opcode translation, performing insertion of additional information into the second version, such as an identifier corresponding to a particular instance of service 103, etc.

The routing module 106 and services 101-103 may be configured to propagate a routing preference 132 that is provided by the browser 110 and which is associated with the first version of instruction 122A. For instance, the routing module 106 may be configured to associate the routing preference 132 with the second version of instruction 122A before forwarding the second version of instruction 122A to service 101. The service 101 may be configured to associate the routing preference 132 with the first version of instruction 122B before forwarding the first version of instruction 122B to the routing module 106. The routing module 106 may be configured to associate the routing preference 132 with the second version of instruction 122B before forwarding the second version of instruction 122B to service 102. The service 102 may be configured to associate the routing preference 132 with the first version of instruction 122C before forwarding the first version of instruction 122C to the routing module 106. The routing module 106 may be configured to associate the routing preference 132 with the second version of instruction 122C before forwarding the second version of instruction 122C to service 102.

In other words, each of the routing module 106 and services 101-103 may be configured to preserve the routing preference 132 over the entire length (or portion of the length) of the call sequence 100. The propagation and preservation can be accomplished by incorporating middleware (not shown) into services 101-103. Any instance of the middleware may be configured to: (1) detect that a new instruction has been generated by the service incorporating an instance of the middleware, and (2) associate the new instruction with a routing preference that is contained in another instruction that is used as a basis for generating the new instruction. Although in one example middleware can be used to effectuate the propagation of routing preference 132 along the call sequence 100, it will be understood that the present disclosure is not limited to any specific method for associating the same routing preference with a series of related instructions (e.g., service calls, etc.).

Additionally or alternatively, in some implementations, the routing preference 132 may be stored beyond the execution of the services 101-103 and used during subsequent executions of the services 101. In some implementations, the routing preference 132 may be written back to cookies so that any subsequent calls from the browser 110 would continue to maintain the routing preference 132.

Additionally or alternatively, in some implementations, along with propagating and preserving the routing preference 132, an instance of the services 101-103 may insert its own version into the copy of the routing preferences 132 that is propagated by that instance. This way any subsequent calls that come to the same services within the session will stick to the same version of the service.

Figure 2:
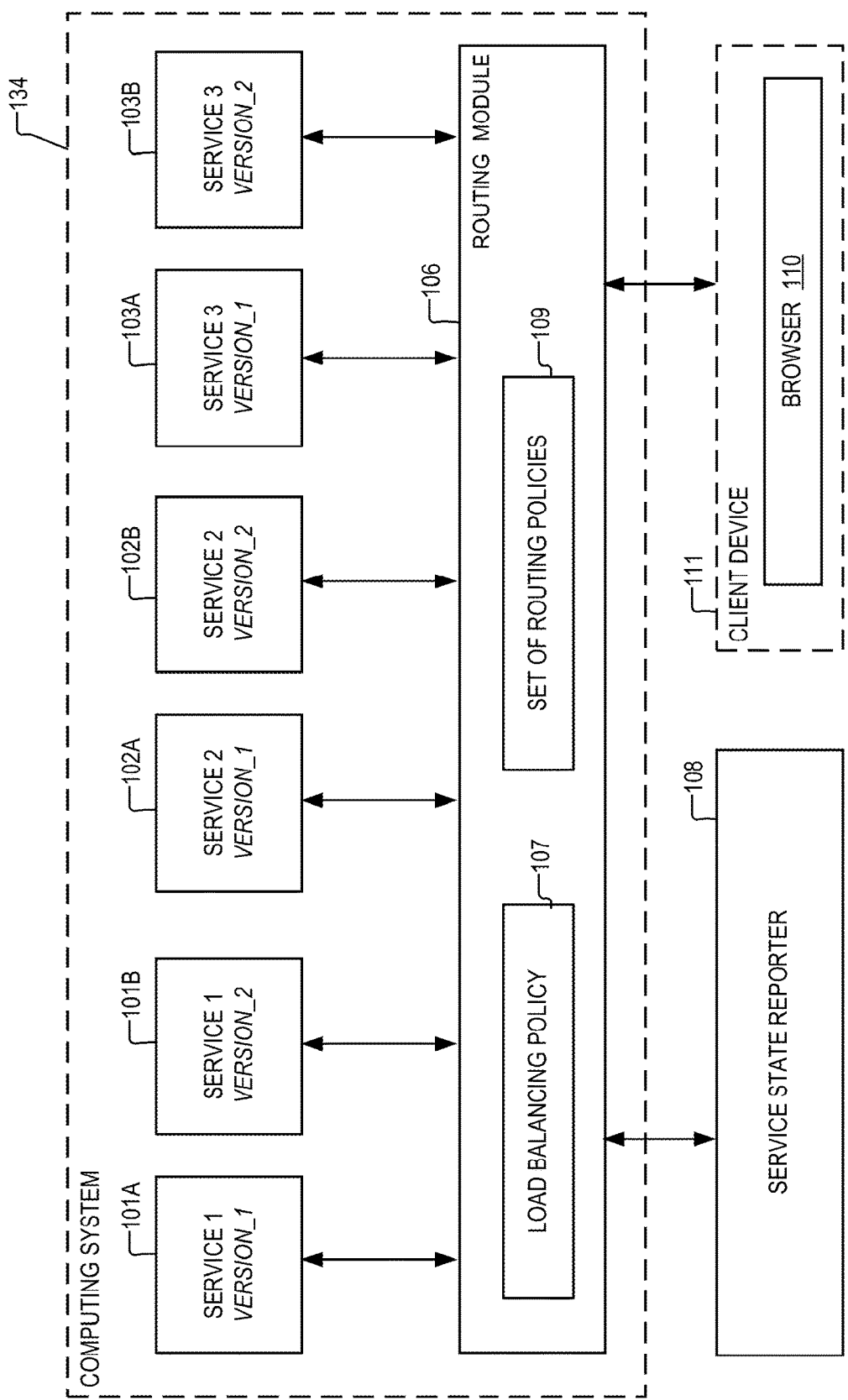
FIG. 2 is a diagram of an example of a system, according to aspects of the disclosure.

FIG. 2 is a diagram illustrating the configuration of computing system 134 in further detail. As illustrated, the computing system 134 may be configured to execute instances 101A and 101B of service 101. Each of instances 101A and 101B may include one or more respective processes. Instance 101A may be generated based on at least a first file that is associated with service 101 (e.g., an executable file, source code file, etc.). Instance 101B may be generated based on at least a second file that is associated with service 101 (e.g., an executable file, source code file, etc.). The second file may be a later (or otherwise different) version of the first file.

The computing system 134 may be configured to execute instances 102A and 102B of service 102. Each of instances 102A and 102B may include one or more respective processes. Instance 102A may be generated based on at least a first file that is associated with service 102 (e.g., an executable file, source code file, etc.). Instance 102B may be generated based on at least a second file that is associated with service 102 (e.g., an executable file, source code file, etc.). The second file may be a later (or otherwise different) version of the first file.

The computing system 134 may be configured to execute instances 103A and 103B of service 103. Each of instances 103A and 103B may include one or more respective processes. Instance 103A may be generated based on at least a first file that is associated with service 103 (e.g., an executable file, source code file, etc.). Instance 103B may be generated based on at least a second file that is associated with service 103 (e.g., an executable file, source code file, etc.). The second file may be a later (or otherwise different) version of the first file.

The routing module 106 may be configured to enforce (or execute) a load balancing policy 107 that is stored in (non-volatile and/or volatile) memory of computing system 134. The load balancing policy 107 is discussed in further detail with respect to FIG. 4. The routing module 106 may be configured to enforce (or execute) a set of one or more routing policies 109 that are stored in (non-volatile and/or volatile) memory of computing system 134. The load balancing policy 107 is discussed in further detail with respect to FIG. 4. Examples of routing policies that may be part of the set 109 are discussed further below with respect to FIGS. 5A-B. In some implementations, the load balancing policy 107 may be updated as any of the services 101-103 evolves and acquires newer versions or functionalities as a result. Moreover, as a service's deployment/hosting location changes, the load balancing policy 107 may need to be updated.

The computing system 134 may be operatively coupled to a service state reporter. The service state reporter 108 may include software that is configured to report (to the routing module 106) the state of each of services 101-103. The state of any of services 101-103 may include the count of different versions of the service that are running on the computing system 134. For example, if all instances of service 101 that are running on the computing system 134 were the same version, the state of service 101 would be "1". As another example, and as illustrated in FIG. 2, if only two instances of different versions of service 101 are running on the computing system 134, the state of service 101 would be "2". As yet another example, if two instances of a first version of service 101 and five instances of a second version of service 101 are running on the computing system 134, the state of service 101 would be "2" (that is assuming that no instances of other versions of the service 101 are running on the computing system 134). It will be understood that any number of different versions of a service can be executed at the same time on the computing system 134 (e.g., 3, 5 10, etc.). Although in the present example the state of a service is determined based on a count of different versions that are running, it will be understood that the present disclose is not limited to any specific definition of "service state."

The service state reporter 108 may include a software deployment software, such as GitHub™, which is configured to deploy each of service instances 101A-B, 102A-B, and 103A-B onto the computing system 134. However, the present disclosure is not limited to any specific implementation of the service state reporter 108. In the example of FIG. 2, the service state reporter 108 is executed on a computing device that is different from the computing system 134. However, alternative implementations are possible in which the service state reporter is executed on the computing system 134. Although the service state reporter 108 is depicted as being separate of the routing module 106, alternative implementations are possible in which the service state reporter 108 is integrated into the routing module 106. Stated succinctly, the present disclosure is not limited to any specific implementation of the service state reporter 108.

FIG. 3 is a diagram illustrating the routing preference 132 in further detail. Routing preference 132 may include portions 301-303. As illustrated, portion 301 indicates that any instruction for service 101 that is associated with the routing preference 132 should be preferably routed to an instance of a second version of service 101. Portion 302 indicates that any instruction for service 102 that is associated with the routing preference 132 should be preferably routed to an instance of a first version of service 102. Portion 303 indicates that any instruction for service 103 that is associated with the routing preference 132 should be preferably routed to an instance of a first version of service 103. In some implementations, an instruction may be associated with a routing preference, if the routing preference is integrated (e.g., encapsulated) into the instruction (i.e., if the routing preference is inserted into a header field or body of the instruction). Additionally or alternatively, in some implementations, an instruction may be associated with a routing preference, if the routing preference is integrated (e.g., encapsulated) into a cookie associated with the instruction. As used throughout the disclosure, the term "routing preference" shall refer to any of a number, string, alphanumerical string, or object, which identifies a preferred version of at least one service.

FIG. 4 is a diagram of the load balancing policy 107, according to aspects of the disclosure. As illustrated, load balancing policy 107 may include portions 401. Portion 401 specifies that 60% of all instructions for service 101 should be routed to an instance of a first version of service 101 (e.g., instance 101A) and 40% of all instructions for service 101 should be routed to an instance of a second version of service 101 (e.g., instance 101B). Portion 402 specifies that 55% of all instructions for service 102 should be routed to an instance of a first version of service 102 (e.g., instance 102A) and 45% of all instructions for service 102 should be routed to an instance of a second version of service 102 (e.g., instance 102B). Portion 403 specifies that 53% of all instructions for service 103 should be routed to an instance of a first version of service 103 (e.g., instance 103A) and 47% of all instructions for service 103 should be routed to an instance of a second version of service 103 (e.g., instance 103B). As used throughout the disclosure, the term load "load balancing policy" shall refer to any number, string, alphanumerical string or object that fully or partially specifies a distribution of a load among different instances of the same service.

FIGS. 5A-C show examples of policies 501-503, which may be part of the set of routing policies 109 (shown in FIG. 2). Each of the policies 501-503 may guide the selection of the version of a service that is going to receive an instruction designated for the service. An instruction that is routed based on one of the policies 501-503 may be the same or similar to any of instructions 122A-C.

Routing policy 501 guides the selection of a version of service 101. Routing policy 501 may be used to route an instruction for service 101 to a particular instance of service 101. Routing policy 501 is predicated on the current state of service 101. Service 101 may be in a first state when instances of two different versions of service 101 are executed on the computing system 134. Service 101 may be in a second state when instances of three different versions of service 101 are executed on the computing system 134. Routing policy 501 specifies that when service 101 is in the first state, a version of the service 101 is selected that would preserve compliance with a load balancing goal (e.g., the load balancing goal 107). Routing policy 501 further specifies that when service 101 is in the second state, a version of the service 101 is selected that is specified by a routing preference (e.g., routing preference 132 or any routing preference that is associated with an instruction which the routing policy 501 is used to route).

Routing policy 502 guides the selection of a version of service 102. Routing policy 502 may be used to route an instruction for service 102 to a particular instance of service 102. Routing policy 502 is predicated on the current state of service 102. Service 102 may be in a first state when instances of two different versions of service 102 are executed on the computing system 134. Service 102 may be in a second state when instance(s) of only one version of service 102 are executed on the computing system 134. Routing policy 502 specifies that when service 102 is in the first state, a version of the service 101 is selected that is specified by a routing preference a routing preference (e.g., routing preference 132 or any routing preference that is associated with an instruction which the routing policy 502 is used to route). Routing policy 502 further specifies that when service 102 is in the second state, a default version of the service 102 should be selected—e.g., the only version of the service 102 instances of which are being executed on the computing system 134.

Routing policy 503 guides the selection of a version of service 103. Routing policy 503 may be used to route an instruction for service 103 to a particular instance of service 103. Routing policy 503 is predicated on an identifier of the sender of the instruction. The identifier, according to the present example is a source IP address of the incoming instruction. However, alternative implementations are possible in which another type of identifier is used, such as a process ID belonging to the sender, a MAC address, sender email address, username, etc. Routing policy 503 specifies that when the sender ID satisfies a first condition, a first version of the service 103 is selected to receive the incoming instruction. The first condition may be satisfied when the IP address of the sender matches a first IP range. Routing policy 503 further specifies that when service 103 satisfies a second condition, a second version of the service 103 selected to receive the incoming instruction. The second condition may be satisfied when the IP address of the sender matches a second IP range. Routing policy 503 further specifies that when neither the first condition nor the second condition is satisfied, a version of the service 102 is selected that is specified by a routing preference (e.g., routing preference 132 or any routing preference that is associated with the instruction).

Figures 6, 7:
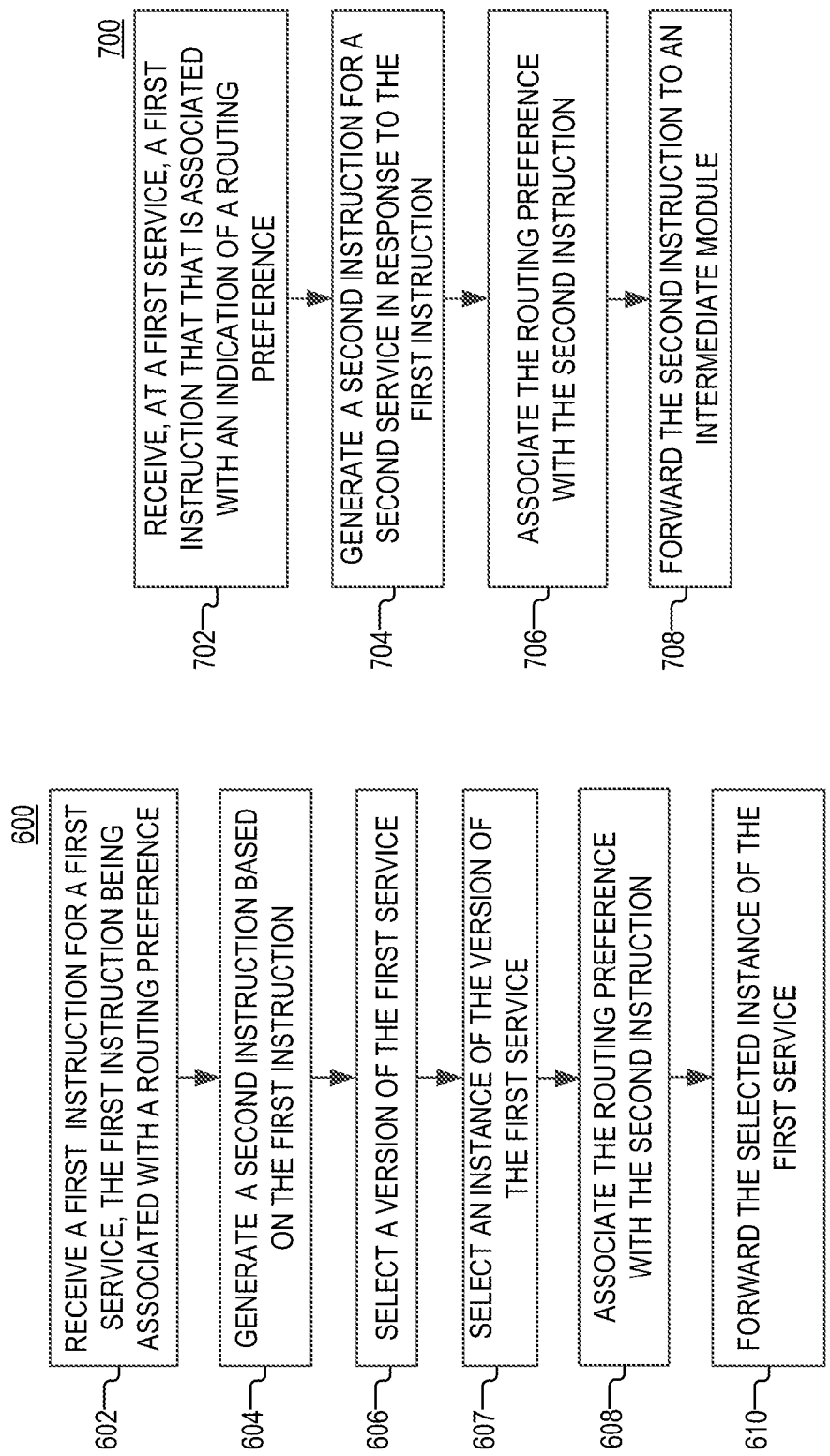
FIG. 6 is a flowchart of an example of a process, according to aspects of the disclosure.
FIG. 7 is a flowchart of an example of a process, according to aspects of the disclosure.

FIG. 6 is a flowchart of an example of a process 600 that is performed by the routing module 106, according to aspects of the disclosure.

At step 602, the routing module 106 receives a first instruction for a first service. The first instruction may be received from the browser 110 or any of services 101-102. The first instruction may be a first message including a first operation identifier (e.g., an opcode). The first operation identifier may identify a first operation that the first service is being instructed to perform. The first instruction may or may not include one or more operation parameters for the first operation. According to the present example, the first instruction is associated with a routing preference that identifies a specific version of the first service, which the first instruction is preferred to be executed by. The routing preference may be the same or similar to the routing preference 132, which is discussed above with respect to FIGS. 1 and 3, and as such it may also identify preferred versions of other services which might be called by the first service in response to the first instruction. According to the present example, the routing preference is contained in a header field of the first message. However, alternative implementations are possible in which the routing preference is contained in a first cookie associated with the first instruction, which is accessible by the routing module 106. When the first instruction is received from the browser 110, the first cookie may be stored on a computing device that is executing the browser 110 (e.g., the client device 111).

At step 604, the routing module 106 generates a second instruction for the first service. The second instruction is generated based on the first instruction. The second instruction may include a second message including a second operation identifier. The second operation identifier may identify one of: (i) the first operation or (ii) a second operation that is obtained by decomposing the first operation into subtasks. In some implementations, the second instruction may be an exact copy of the first instruction and the first operation identifier may be the same as the second operation identifier. Additionally or alternatively, in some implementations, the second instruction may be generated as a result of decomposing the first instruction into subtasks. Additionally or alternatively, in some implementations, the second instruction may be a different version of the first instruction, which may have different syntax and/or format, but which identifies the same or similar operation as the first instruction. Additionally or alternatively, in some implementations, the second instruction may be generated by inserting additional information into the first instruction, such as an identifier corresponding to a particular instance of service 101, etc.

At step 606, the routing module 106 selects a version of the first service which is going to receive and execute the second instruction. The version of the first service may be selected in accordance with any of processes 800A-C, which are discussed further below with respect to FIGS. 8A-C.

At step 607, the routing module 106 selects a specific instance of the version of the first service, which is selected at step 606. The selected instance is one that is going to receive and execute the first instruction.

At step 608, the routing module 106 associates the routing preference with the second instruction. In some implementations, both the first and second messages may be HTTP messages. In such implementations, associating the routing preference with the second instruction may include inserting the routing preference in a header field (or another portion) of the second instruction.

At step 610, the routing module 106 forwards the second instruction to an instance of the version of the first service that is selected at step 606 (i.e., the instance selected at step 607). In some implementations, forwarding the second instruction may include transmitting the first instruction over a communications network, storing the first instruction at a predetermined memory location, or taking any other action that would cause the instance of the first service (selected at step 607) to obtain the second instruction. In some respects, the first instruction may designate the first service as its intended recipient, without identifying which specific instance of the first service should receive and execute the first instruction (this is assuming that more than one instance is running on computing system 134). As noted above, the specific instance of the first service which ends up executing the first instruction is selected at step 606—and before this step is executed, it is not certain which instance of the first service will execute the first instruction (or portion thereof). It will be recalled that the second instruction may be regarded as one of: (i) a different version of the first instruction, (ii) a copy of the first instruction, or (iii) a portion of the first instruction. Under the nomenclature of the present application, the first instruction (received at step 602) and the second instruction (generated at step 604) are regarded as different "versions" of the same instruction. In this regard, the phrases "in response to the first instruction" and "in response to the second instruction" may be used interchangeably when permitted by context. Similarly, the phrases "executing the first instruction" and "executing the second instruction" may be used interchangeably when permitted by context.

FIG. 7 is a flowchart of an example of a process 700 that is performed by an instance of a first service in response to a message from the routing module 106, according to aspects of the disclosure. The first service may be the same or similar to any of services 101-103.

At step 702, the first service instance receives a first instruction for the first service. The first instruction may be received from the routing module 106. The first instruction may be a first message including a first operation identifier (e.g., an opcode). The first operation identifier may identify an operation, which the first service instance is being requested to perform. The first instruction may or may not include one or more operation parameters for the operation. According to the present example, the first instruction is associated with a routing preference that identifies a specific version of the first service, which the first instruction is preferred to be executed by. The routing preference may be the same or similar to the routing preference 132, which is discussed above with respect to FIGS. 1 and 3, and as such it may also identify preferred versions of other services which might be called by the first service in response to the first instruction. According to the present example, the routing preference is contained in a header field (or another portion) of the first message.

At step 704, the first service instance generates a second instruction for a second service. The second service may be different from the first service. The second service it may be the same or similar to another one of services 101-103. The second instruction is generated in response to the first instruction. In some implementations, the first instruction may be the same or similar to the instruction 122A and the second instruction may be the same or similar to the instruction 122B. The second instruction may include a second message including a second operation identifier that is different from the first operation identifier. In some implementations, the second instruction may include information that is generated as a result of executing the first instruction. Additionally or alternatively, in some implementations, the second instruction may be issued as part of executing the first instruction, and it may return information that is needed for the completion of the first instruction.

At step 706, the first service instance associates the second instruction with the routing preference. In implementations in which the second instruction is an HTTP message, associating the routing preference with the second instruction may include copying the routing preference into the header of the HTTP message.

At step 708, the first service instance provides the second instruction to the routing module 106. The second instruction that is provided to the routing module 106 indicates that it is designated for the second service, but it does not identify a specific instance of the second service which is to receive and execute the second instruction. As discussed above with respect to FIG. 6, the specific instance is selected by the routing module 106.

Figure 8A:
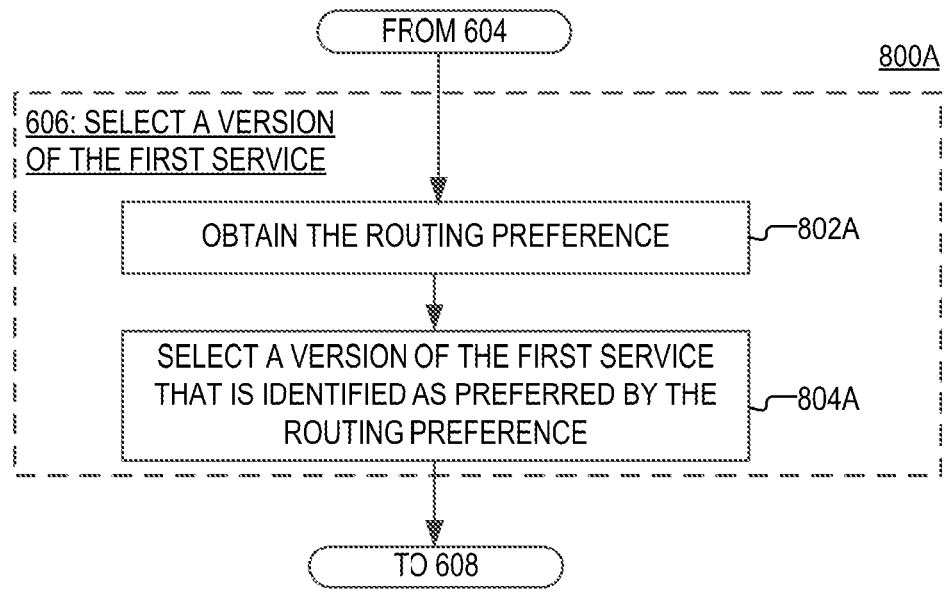
FIG. 8A is a flowchart of an example of a process, according to aspects of the disclosure.

FIG. 8A is a flowchart of an example of a process 800A for selecting a version of a first service, as specified at step 606 of the process 600. At step 802A, the routing module 106 obtains the routing preference that is associated with the first instruction. At step 804A, the routing module 106 selects a version of the first service that is identified as preferred by the routing preference.

Figure 8B:
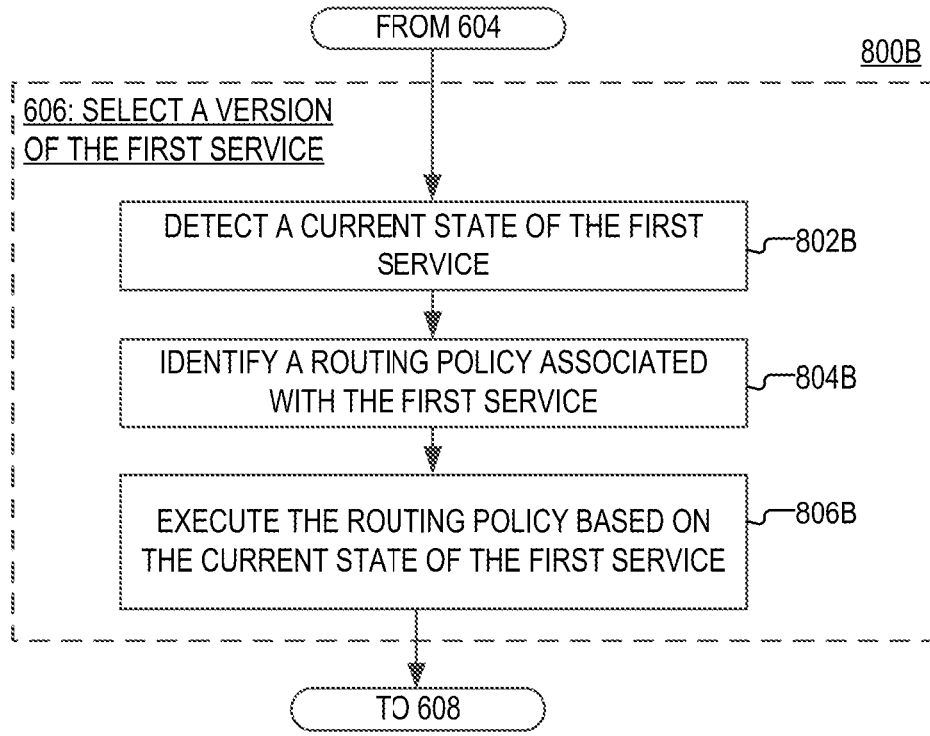
FIG. 8B is a flowchart of an example of a process, according to aspects of the disclosure.

FIG. 8B is a flowchart of an example of a process 800B for selecting a version of a first service, as specified at step 606 of the process 600. At step 802B, the routing module detects a state of the first service. In some implementations, detecting the state of the first service may include detecting a count of different versions of the first service, whose instances are currently being executed by the computing system 134. At step 804B, the routing module identifies a routing policy that is associated with the first service. The routing policy may be one that is predicated on the current state of the first service. By way of example, the routing policy may be the same or similar to one of policies 501 and 502, which are discussed above with respect to FIGS. 5A-B. At step 806B, the routing module 106 executes the selected routing policy based on the current state of the first service. As can be readily appreciated, executing the selected routing policy yields the version of the first service which is to receive the instruction (transmitted at step 610).

Figure 8C:
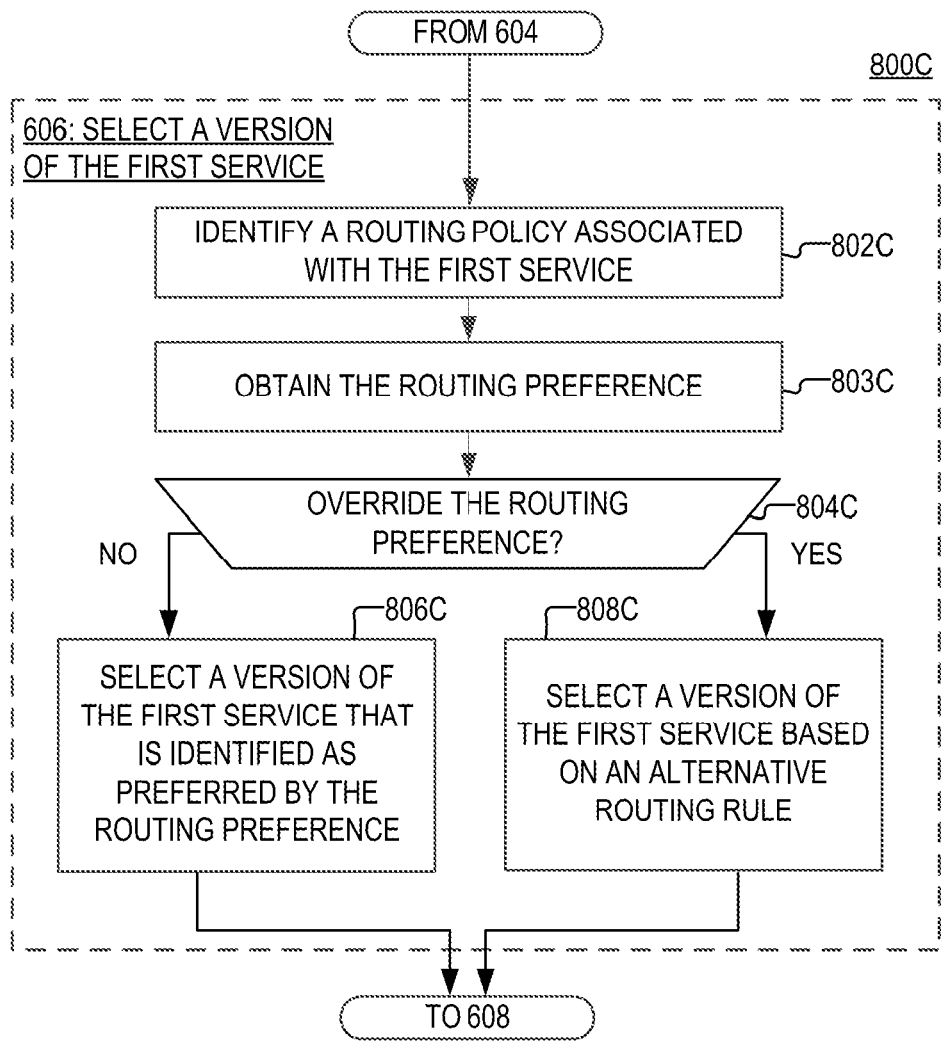
FIG. 8C is a flowchart of an example of a process, according to aspects of the disclosure.

FIG. 8C is a flowchart of an example of a process 800C for selecting a version of a first service, as specified at step 606 of the process 600. At step 802C, the routing module 106 identifies a routing policy that is associated with the first service. The routing policy may include any routing policy that specifies circumstances under which the routing preference is not going to be considered when selecting a version of the first service which is going to receive the instruction (received at step 602). By way of example, the identified routing policy may be the same or similar to any of policies 501-503, which are discussed above with respect to FIG. 5A-C. At step 803C, the routing module 106 obtains the routing preference that is associated with the first instruction. At step 804C, the routing module 106 determines whether to override the routing preference. The determination is made by evaluating one or more conditions that are specified in the routing policy. If it is determined to not override the routing preference, the process 800C proceeds to step 806C. Otherwise, the process 800C proceeds to step 808C. At step 806C, the routing module 106 selects a version of the first service that is specified by the routing preference associated with the first instruction. At step 808C, the routing preference 808 selects a version of the first service by evaluating another rule that is part of the routing policy. The alternative rule may be one that is based on IP address range mappings (e.g., see policy 503 shown in FIG. 5C) or a rule that specifies a default service version (e.g., see policy 502 shown in FIG. 5B).

In some implementations, any of the services discussed with respect to FIGS. 1-8C may include a microservice, such as Kubernetes microservices. However, the present disclosure is not limited to any specific implementations of the services. It will be understood that the techniques presented throughout the disclosure can be used to route traffic between any suitable type of services. It will be further understood that the techniques presented throughout the disclosure can be deployed in products that are used to route microservice-based ecosystem traffic. Furthermore, the techniques presented throughout the disclosure can be used for traditional SOA or monolithic ecosystems as well.

In some implementations, the techniques presented throughout the disclosure can be used in the testing of a beta version of a microservice, which is deployed on a production system concurrently with a mature version of the microservice. For example, the techniques may be used to route user traffic to the mature version and test traffic to the beta version. As another example, the techniques may be used control the load which is placed on the beta version. In other words, the techniques presented throughout the disclosure are advantageous because they can further improve the manner in which service beta versions are tested. However, the techniques are not limited to being used in a software development and testing context. In this regard, it will be understood that the techniques may be used in any suitable context where version-based routing is desired.

In some implementations, the association of a routing preference with instruction may be optional. In such implementations, when an instruction has a routing preference associated with it, the routing module may route the instruction in the manner discussed above with respect to FIGS. 1-8C. As a result of using the routing preference, the routing module 106 may route the instruction to an instance of a new version of a service, which is currently being tested However, when the instruction does not have a routing preference associated with it, the routing module 106 may route the service to a default version of the service. The default version of the service may be a mature version of the system.

According to the example of FIG. 1-8C, a routing preference may be associated with an instruction that is received at the routing module 106 from the browser 110. The routing preference may be contained in the header or payload of the message containing the instruction. Alternatively, the routing preference may be contained in a cookie of the browser 110 that is stored on the client device 111. The instruction received from the browser 110 may set off a sequence of service calls that are generated by the services 101-103. The routing preference may select a preferred version for all or fewer than all of the services 101-103. The services 101-103 and the routing module 106 may propagate the routing preference along the sequence of service calls (or portion thereof) by inserting the routing preference in the header (or payload) of messages that contain subsequent instructions for the services 101, and which are generated by any of the services 101-103 or the routing module 106.

According to the example of FIG. 1-8C, an instruction received from the browser 110 may lack any routing preferences, or it may lack a routing preference for a particular one of the services 101-103. Furthermore, a routing preference that is associated with an instruction may be overridden. As noted above, the routing module 106 may use routing policies and/or load balancing policies to determine a preferred version of a particular service, which is going to receive an instruction that is either transmitted directly by the browser 110 or a part of a service call sequence that is triggered by the browser 110. When a load balancing policy and/or routing policy is used to resolve the preferred version of a particular service (or override a previous routing policy), the preferred version may be stored (by the routing module 106) in a cookie, which is stored in the memory of the client device 111. Doing so may essentially establish (or change) a routing preference for the service, and it may cause the preferred version to be used for any subsequent calls to the service that originate (directly or indirectly) from the browser 110 and/or client device 111.

Figure 9:
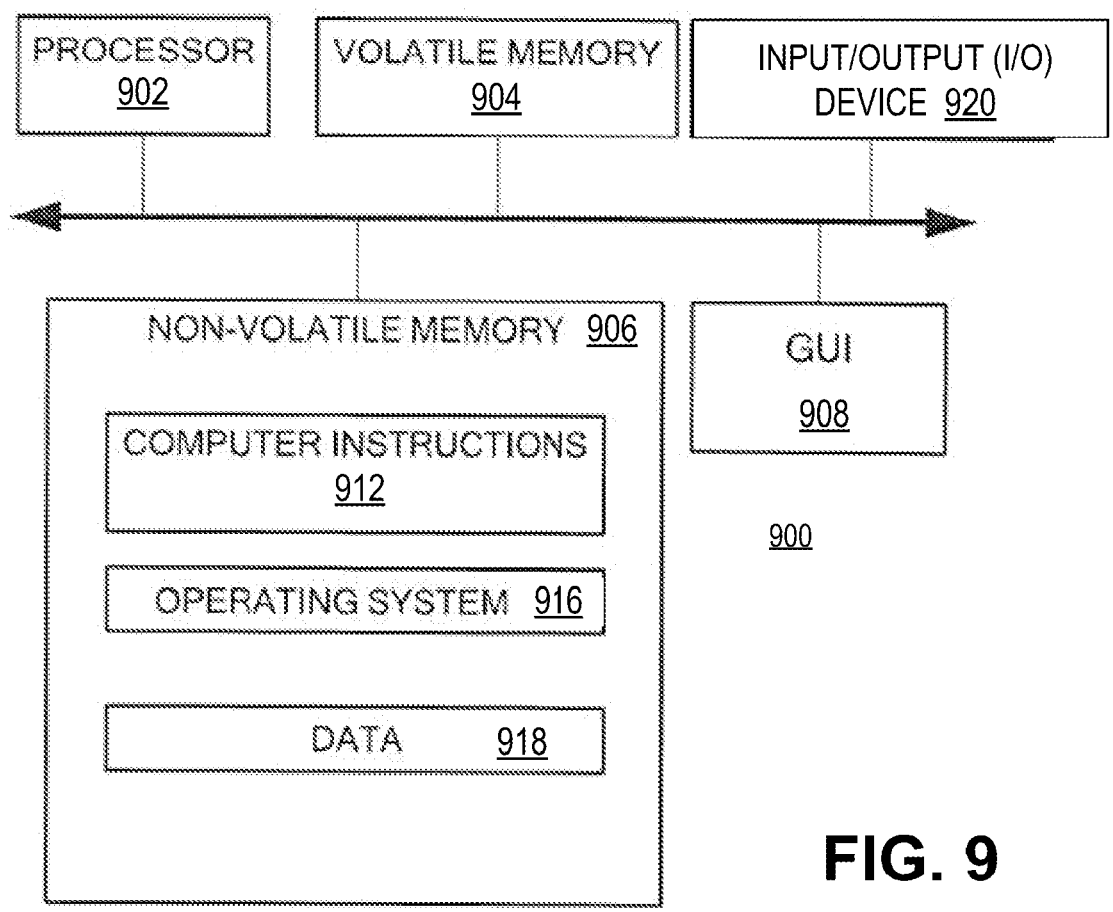
FIG. 9 is a diagram of an example of a computing device, according to aspects of the disclosure.

Referring to FIG. 9, computing device 900 may include processor 902, volatile memory 904 (e.g., RAM), non-volatile memory 906 (e.g., a hard disk drive, a solid-state drive such as a flash drive, a hybrid magnetic and solid-state drive, etc.), graphical user interface (GUI) 908 (e.g., a touchscreen, a display, and so forth) and input/output (I/O) device 920 (e.g., a mouse, a keyboard, etc.). Non-volatile memory 906 stores computer instructions 912, an operating system 916 and data 918 such that, for example, the computer instructions 912 are executed by the processor 902 out of volatile memory 904. Program code may be applied to data entered using an input device of GUI 908 or received from I/O device 920.

Processor 902 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application-specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

FIGS. 1-9 are provided as an example only. At least some of the steps discussed with respect to FIGS. 1-9 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. ./. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
obtaining a first instruction for a first service, the first instruction being associated with a routing preference;
generating a second instruction for the first service based on the first instruction;
associating the second instruction with the routing preference; and
providing the second instruction to the first service,
wherein associating the second instruction with the routing preference includes inserting an indication of the routing preference in the second instruction.

2. The method of claim 1, wherein the first instruction is received from a browser that is executed on a client device, the method further comprising preserving the routing preference in a cookie that is stored in a memory of the client device, the routing preference being preserved for future use in subsequent service calls to the first service or calls to other services that are placed by the browser.

3. The method of claim 1, wherein the routing preference identifies a preferred version of a second service that is associated with the first instruction.

4. The method of claim 1, wherein the routing preference identifies a preferred version of the first service, and providing the second instruction to the first service includes:
selecting a version of the first service based on the routing preference; and providing the second instruction to an instance of the selected version of the first service.

5. The method of claim 1, wherein the routing preference identifies a preferred version of the first service and a preferred version of a second service, and providing the second instruction to the first service includes:
   detecting a count of different versions of the first service, which are currently executing on a computing system; and
   overriding the indication of the routing preference based on the detected count, the overriding including selecting a version of the first service based on a routing policy and providing the second instruction to an instance of the selected version of the first service.

6. The method of claim 1, wherein the routing preference identifies a preferred version of the first service and a preferred version of a second service, and providing the second instruction to the first service includes:
   detecting a count of different versions of the first service, which are currently executing on a computing system; and
   overriding the indication of the routing preference based on the detected count, the overriding including selecting a version of the first service based on a load balancing policy, and providing the second instruction to an instance of the selected version of the first service.

7. The method of claim 1, wherein the routing preference identifies a preferred version of the first service and a preferred version of a second service, and providing the second instruction to the first service includes:
   detecting a state of the first service; and
   overriding the indication of the routing preference based on the detected state, the overriding including selecting a version of the first service based on a routing policy and providing the second instruction to an instance of the selected version of the first service.

8. The method of claim 1, wherein the routing preference identifies a preferred version of the first service and a preferred version of a second service, and providing the second instruction to the first service includes:
   detecting a state of the first service; and
   overriding the indication of the routing preference based on the detected state, the overriding including selecting a version of the first service based on a load balancing policy, and providing the second instruction to an instance of the selected version of the first service.

9. A system, comprising:
   a memory; and
   at least one processor operatively coupled to the memory, the at least one processor being configured to perform the operations of:
   obtaining a first instruction for a first service, the first instruction being associated with a routing preference;
   generating a second instruction for the first service based on the first instruction;
   associating the second instruction with the routing preference; and
   providing the second instruction to the first service,
   wherein associating the second instruction with the routing preference includes at least one of inserting an indication of the routing preference in the second instruction, and/or inserting the indication of the routing preference into a cookie.

10. The system of claim 9, wherein the first instruction is received from a browser that is executed on a client device, and the at least one processor is further configured to perform the operation of preserving the routing preference in a cookie that is stored in a memory of the client device, the routing preference being preserved for future use in subsequent service calls to the first service or calls to other services that are placed by the browser.

11. The system of claim 9, wherein the routing preference identifies a preferred version of a second service that is associated with the first instruction.

12. The system of claim 9, wherein the routing preference identifies a preferred version of the first service, and providing the second instruction to the first service includes:
   selecting a version of the first service based on the routing preference; and
   providing the second instruction to an instance of the selected version of the first service.

13. The system of claim 9, wherein the routing preference identifies a preferred version of the first service and a preferred version of a second service, and providing the second instruction to the first service includes:
   detecting a count of different versions of the first service, which are currently executing on a computing system; and
   overriding the indication of the routing preference based on the detected count, the overriding including selecting a version of the first service based on a routing policy and providing the second instruction to an instance of the selected version of the first service.

14. The system of claim 9, wherein the routing preference identifies a preferred version of the first service and a preferred version of a second service, and providing the second instruction to the first service includes:
   detecting a count of different versions of the first service, which are currently executing on a computing system; and
   overriding the indication of the routing preference based on the detected count, the overriding including selecting a version of the first service based on a load balancing policy, and providing the second instruction to an instance of the selected version of the first service.

15. The system of claim 9, wherein the routing preference identifies a preferred version of the first service and a preferred version of a second service, and providing the second instruction to the first service includes:
   detecting a state of the first service; and
   overriding the indication of the routing preference based on the detected state, the overriding including selecting a version of the first service based on a routing policy and providing the second instruction to an instance of the selected version of the first service.

16. The non-transitory computer-readable medium of claim 15, wherein the routing preference identifies a preferred version of the first service, and providing the second instruction to the first service includes:
   selecting a version of the first service based on the routing preference; and
   providing the second instruction to an instance of the selected version of the first service.

17. The system of claim 9, wherein the routing preference identifies a preferred version of the first service and a preferred version of a second service, and providing the second instruction to the first service includes:
   detecting a state of the first service; and
   overriding the indication of the routing preference based on the detected state, the overriding including selecting a version of the first service based on a load balancing policy, and providing the second instruction to an instance of the selected version of the first service.

18. A non-transitory computer-readable medium storing one or more processor-executable instructions, which, when executed by at least one processor, cause the at least one processor to perform the operations of:
  obtaining a first instruction for a first service, the first instruction being associated with a routing preference;
  generating a second instruction for the first service based on the first instruction;
  associating the second instruction with the routing preference; and
  providing the second instruction to the first service,
  wherein associating the second instruction with the routing preference includes at least one of inserting an indication of the routing preference in the second instruction, and/or inserting the indication of the routing preference into a cookie.

19. The non-transitory computer-readable medium of claim 18, wherein the first instruction is received from a browser that is executed on a client device, and the one or more processor-executable instructions, when executed by the at least one processor, further cause the at least one processor to perform the operation of preserving the routing preference in a cookie that is stored in a memory of the client device, the routing preference being preserved for future use in subsequent service calls to the first service or calls to other services that are placed by the browser.

20. The non-transitory computer-readable medium of claim 18, wherein the routing preference identifies a preferred version of a second service that is associated with the first instruction.

* * * * *